United States Patent
Bershadsky et al.

(10) Patent No.: US 7,673,436 B2
(45) Date of Patent: Mar. 9, 2010

(54) LOADING ASSEMBLY FOR PACKAGING SYSTEM

(75) Inventors: Boris Bershadsky, San Clemente, CA (US); Vadim A. Lubezny, Buffalo Grove, IL (US)

(73) Assignee: Triangle Package Machinery Company, Chicago, IL (US)

( * ) Notice: Subject to any disclaimer, the term of this patent is extended or adjusted under 35 U.S.C. 154(b) by 121 days.

(21) Appl. No.: 11/974,681

(22) Filed: Oct. 15, 2007

(65) Prior Publication Data
US 2008/0210518 A1 Sep. 4, 2008

Related U.S. Application Data

(60) Provisional application No. 60/852,372, filed on Oct. 17, 2006.

(51) Int. Cl.
*B65B 5/06* (2006.01)
*B65B 35/24* (2006.01)
*B65B 43/26* (2006.01)
*B65G 47/26* (2006.01)

(52) U.S. Cl. ............... 53/251; 53/250; 53/564; 53/566; 53/389.1; 198/460.2

(58) Field of Classification Search ........... 53/249–251, 53/253, 564, 566, 389.1; 198/812, 588, 459.8, 198/460.2
See application file for complete search history.

(56) References Cited

U.S. PATENT DOCUMENTS

| | | | |
|---|---|---|---|
| 2,757,498 A * | 8/1956 | Meyer-Jagenberg et al. | 53/564 |
| 4,273,567 A * | 6/1981 | Scholl et al. | 65/72 |
| 4,469,219 A * | 9/1984 | Cosse | 198/460.2 |
| 4,961,488 A * | 10/1990 | Steeghs | 198/460.2 |
| 5,511,364 A * | 4/1996 | Levi et al. | 53/570 |
| 5,829,574 A * | 11/1998 | DelSanto | 198/460.2 |
| 6,648,125 B1 | 11/2003 | Bershadsky | |
| 6,725,629 B2 | 4/2004 | Pearce et al. | |
| 7,341,141 B2 * | 3/2008 | Spatafora | 198/460.2 |

FOREIGN PATENT DOCUMENTS

EP 551613 A1 * 7/1993

OTHER PUBLICATIONS

IASE Standard Modules, [online] [retrieved from internet: URL http://www.iase.net/modules/collatormodules.html], [retrieved on Sep. 11, 2006], 1 page.

(Continued)

*Primary Examiner*—Stephen F Gerrity
(74) *Attorney, Agent, or Firm*—Brinks Hofer Gilson & Lione

(57) ABSTRACT

A loading assembly for a packaging system includes a carriage coupled and reciprocally moveable relative to a support structure. The carriage is moveable relative to the support structure along a longitudinal axis in a first direction and a second direction opposite said first direction. A continuous loop configured with a plurality of spaced apart receptacles is moveably supported by the carriage. The loop includes a first portion that is moved at a continuous speed relative to the support structure, and a second portion that is alternatively moved and stopped relative to the support structure. Various methods of loading a receptacle are also provided.

25 Claims, 3 Drawing Sheets

OTHER PUBLICATIONS

IASE Co., Inc., Find Machinery, [online] [retrieved from internet: URL http://222.pmmi.org/a/membercompany.asp?dl_data=2680], [retrieved on Sep. 11, 2006], 2 pages.

IASE Bag Loading, [online] [retrieved from internet: URL http://www.iase.net/20101.html], [retrieved on Sep. 11, 2006], 1 page.

Triangle Package Machinery Company, "ProLine FC: Intermittent Motion Horizontal Cartoner for Bag-In-Box Cartonin . . . ", [online] [retrieved from internet: URL http://www.trianglepackage.com/Flexcell.html], [retrieved on Sep. 25, 2006], 1 page.

ISAE Co., Inc., 2002-2003 PMMI Packaging Machinery Directory, "Robotic Packaging Machinery," dated Sep. 11 2006, brochure p. 195.

* cited by examiner

LOADING ASSEMBLY FOR PACKAGING SYSTEM

This application claims the benefit of U.S. Provisional Application Ser. No. 60/852,372, filed Oct. 17, 2006, the entire disclosure of which is hereby incorporated herein by reference.

FIELD OF THE INVENTION

The present invention relates generally to a packaging system, and in particular, to a loading system for use in the packaging system.

BACKGROUND

Cartoners, or cartoner machines, typically are designed to insert a material or substance, or a package of material or substance, into a carton. For example, the cartoner machine may be configured to open or unfold a carton, insert the material or package into the carton and thereafter close the carton. Cartoners generally are designed to fill and close a large number of cartons in a relatively short period of time, and are typically incorporated into an assembly line. As such, it is important to minimize the amount of time required to fill and close the carton, while at the same time minimizing the number of malfunctions, including for example jamming, breaking or otherwise damaging the package and/or carton, which can lead to downtime of the machine.

Usually, cartoners are configured as vertical cartoners or horizontal cartoners. Typically, the same equipment cannot be used for both the horizontal and vertical cartoners, which can lead to a costly duplication of parts, floor space, and operation know-how.

Vertical cartoners typically insert a material or package of material vertically into a carton having an upwardly facing open end. In this way, gravity assists in the insertion and/or filling process. Typically, the cartons are intermittently or continuously conveyed or moved beneath a filling station at which the carton is filled. As such, in order to insert a product into a carton with vertical cartoning machine at high speed, complicated and expensive mechanisms and technology are required.

Horizontal cartoners typically insert a package of material horizontally into a carton, which typically is configured with an open end that faces sideways. Often, horizontal cartoners include a series of trays, which are shaped to hold the package (usually on three sides), and a series of push members, which gradually push the package horizontally from the tray into a carton as the tray and push members move together along the assembly line. In other configurations, a loader accelerates the package and inserts the package into the carton, which is intermittently stopped for loading. Typically, either of these types of systems requires additional equipment such as product conveyors and loading systems, which add to the cost of the system and an occupy valuable space on the production floor.

SUMMARY

The present invention is defined by the following claims, and nothing in this section should be considered to be a limitation on those claims. By way of introduction, the embodiment of a loading system described below may be incorporated into either a horizontal or vertical packaging system, including horizontal and vertical cartoner systems.

In one embodiment, the loading assembly for a packaging system includes a carriage coupled to, and reciprocally moveable relative to, a support structure. The carriage is moveable relative to the support structure along a longitudinal axis in a first direction and a second direction opposite said first direction. The assembly further includes a continuous loop configured with a plurality of spaced apart receptacles. The loop is moveably supported by the carriage, and is moveable along a continuous path relative to the carriage between at least a first loop speed and a second loop speed. The loop is moved relative to the carriage at the first loop speed when said carriage is moved in the first direction, and the loop is moved relative to the carriage at the second loop speed when the carriage is moved in the second direction. In one preferred embodiment, the second loop speed is greater than the first loop speed.

In one preferred embodiment, the continuous loop includes first and second portions positioned on opposite sides of the longitudinal axis. The first portion moves relative to the carriage in the first direction and the second portion moves relative to the carriage in the second direction. In various embodiments, the first and second portions are spaced apart in the horizontal direction or the vertical direction.

In another aspect, a method for loading a package includes the steps of moving a carriage in a first direction along a longitudinal axis at a first predetermined carriage speed relative to a support structure and moving a continuous loop along a continuous path relative to the carriage at a first loop speed while the carriage is moving in the first direction. The first loop speed is substantially the same as the first predetermined carriage speed. The method further includes moving the carriage in a second direction opposite the first direction along the longitudinal axis at a second predetermined speed, and moving the continuous loop relative to the carriage at a second loop speed while the carriage is moving in the second direction. In one preferred embodiment, the second loop speed is greater than the first loop speed.

In one embodiment, a method for loading a package includes reciprocally moving a carriage in opposite first and second directions along a longitudinal axis relative to a support structure, and moving a continuous loop along a continuous path relative to the carriage as the carriage is reciprocally moved in the first and second directions. The continuous loop includes first and second portions positioned on opposite sides of the longitudinal axis. The method includes moving the first portion of the loop at a constant velocity relative to a support structure as the carriage is reciprocally moved in the first and second directions, and maintaining the second portion of the loop substantially stationary relative to the support structure as the carriage is moved in the first direction.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "carton," as used herein, means any box, bottle, bag, tube, canister, sleeve, pouch, packet or other container, whether rigid or flexible and whether made of cardboard, metal, paper, foil, plastic or any other known and suitable material, capable of holding a substance, or a package containing a substance. The term "package," as used herein, means any box, bottle, bag, tube, canister, sleeve, pouch, packet or other container, whether rigid or flexible and whether made of cardboard, paper, foil, plastic or any other known and suitable material, capable of holding a substance. The term "substance," as used herein, means any liquid, solid, powder, flake, or other like material, including for example and without limitation, various food stuffs, including for example and without limitation, various grains, powders, cereals, liquids, crackers, bars, flakes, vegetables (raw and individually quick frozen), meat, poultry, potato products (including for example french fries) and like materials that are typically packaged for sale to and use by consumers. The term "product" as used herein refers to any "carton," "substance" or "package." The term "longitudinal," as used herein means of or relating to length or the lengthwise direction, and in general corresponds to the machine direction. The term "lateral," as used herein, means situated on, directed toward or running from side to side, and in general corresponds to the cross-machine direction.

Figure 1:
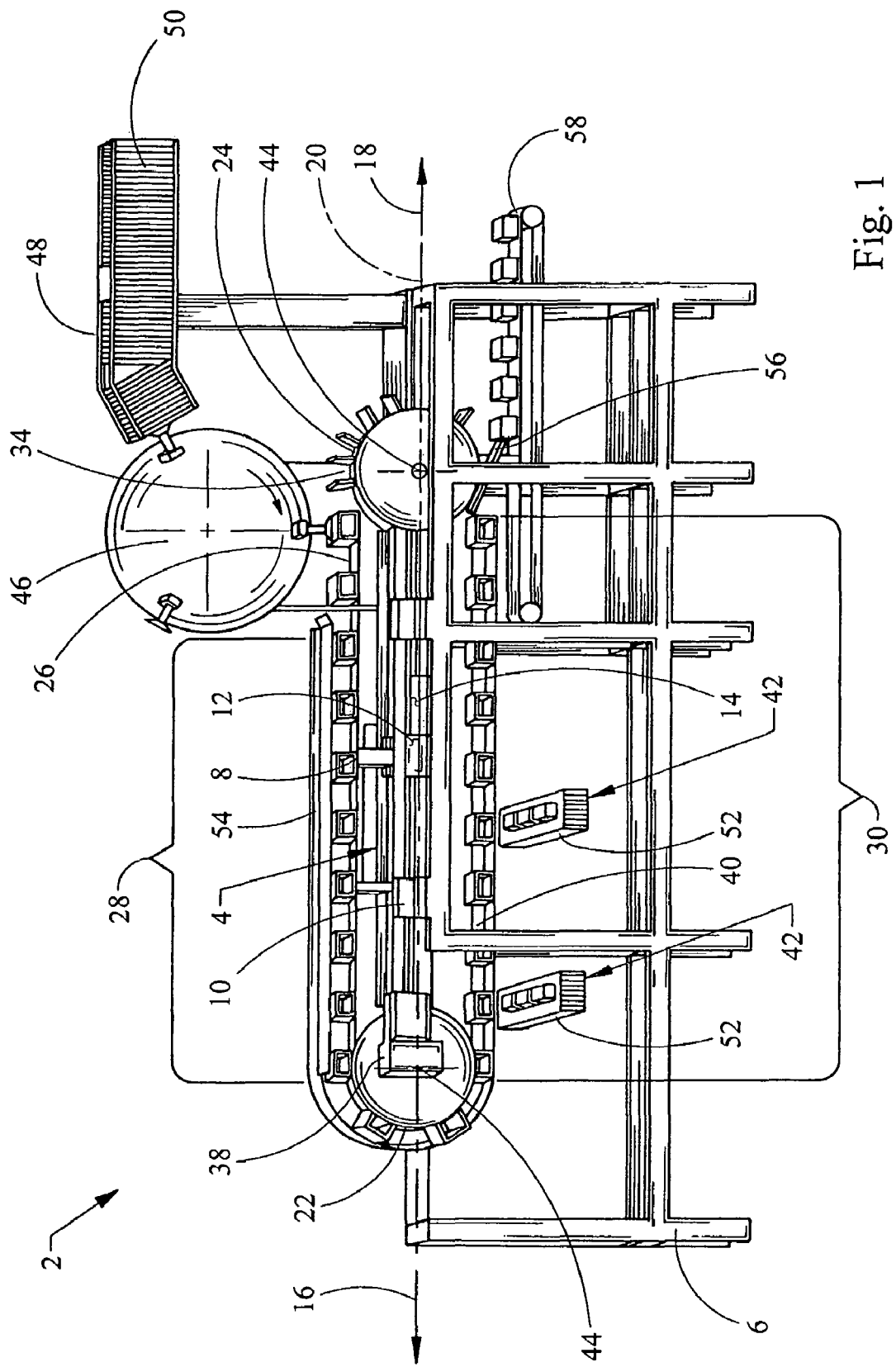
FIG. 1 is a side view of a loading assembly incorporated into a horizontal cartoner.

Referring to FIG. 1, a loading assembly 2 includes a carriage 4 moveably supported by a support structure 6. In particular, the carriage 4 is coupled to a slide support 8, which is slideably supported on the support structure by way of a pillow block and linear ball bearing assembly engaging one or more rods or rails extending from the support structure. An electric cylinder 12, configured with a servo drive 14, is coupled to and reciprocally moves the slide support and carriage 4 relative to the support structure. It should be understood that the carriage can be moved relative to the support structure with any number of actuators, including pneumatic and hydraulic cylinders, screws, etc. The cylinder reciprocally moves the slide support and carriage in longitudinal first and second directions 16, 18 along a longitudinal axis 20.

A drive member 22, configured as a sprocket, is rotatably coupled to and moveable with the carriage 4 at one end thereof. At an opposite end of the carriage, an idler member 24, or sprocket, is rotatably coupled to and moveable with the carriage. A continuous loop 26, configured for example and without limitation as a chain or belt, is disposed around and engaged by the drive and idler members. The loop 26 includes first and second portions 28, 30 spaced apart on opposite sides of a longitudinal axis 20. As used herein, the term "portion" of the loop should be understood to mean the portion of the loop that is instantaneously positioned on one side of the longitudinal axis 20, rather than a fixed portion of the loop that travels along the continuous path. As the loop travels along its continuous path, the first portion 28 moves relative to the carriage 4 in the first longitudinal direction 16, while the second portion 30 moves relative to the carriage 4 in the second longitudinal direction 18. In the embodiment of FIG. 1, the first portion 28 is vertically spaced above the second portion 30, while in the embodiment of FIGS. 2 and 3, the first portion 28 is horizontally spaced from the second portion 30 in a lateral direction 32.

Figure 2:
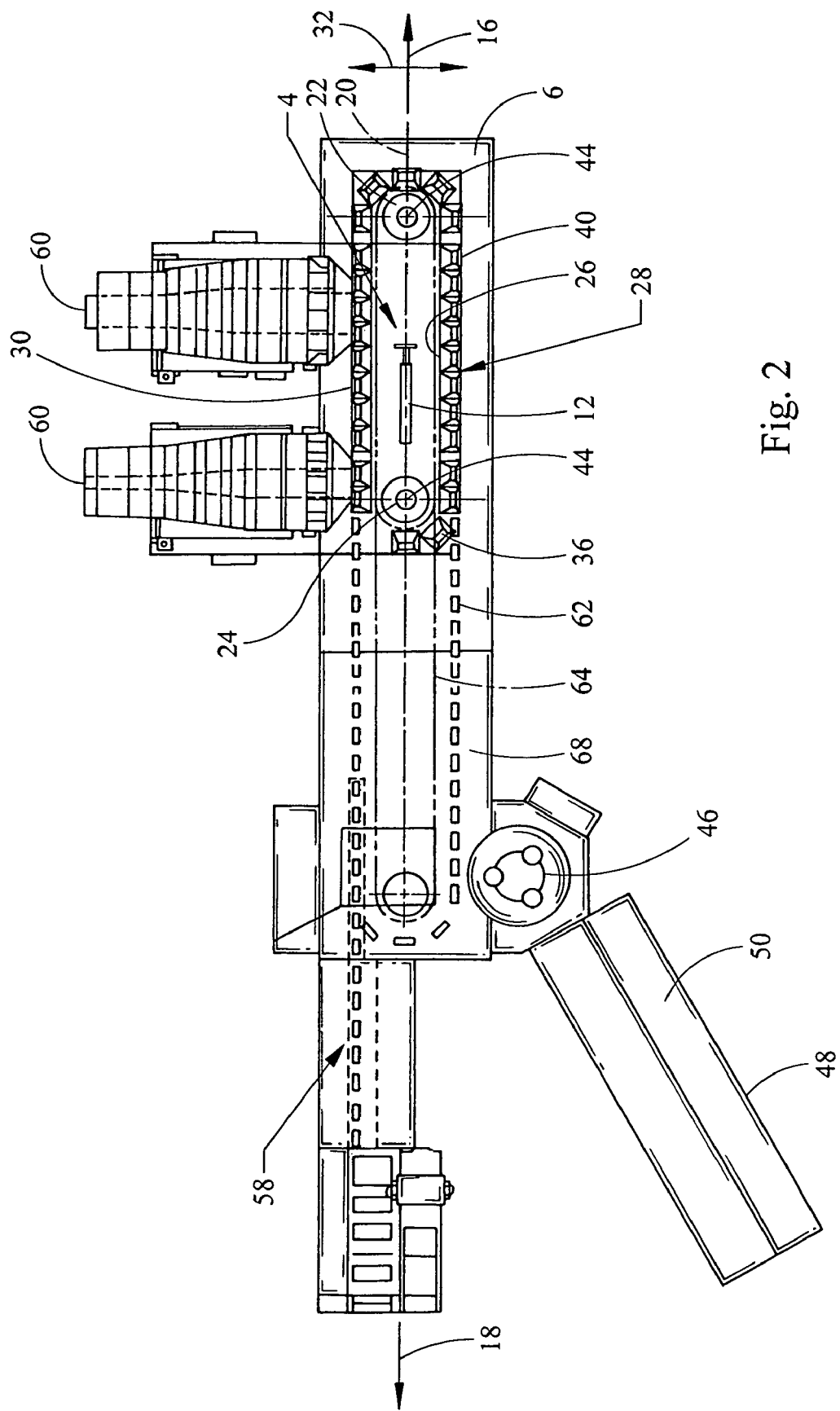
FIG. 2 is a top view of a loading assembly incorporated into a vertical cartoner.
Figure 3:
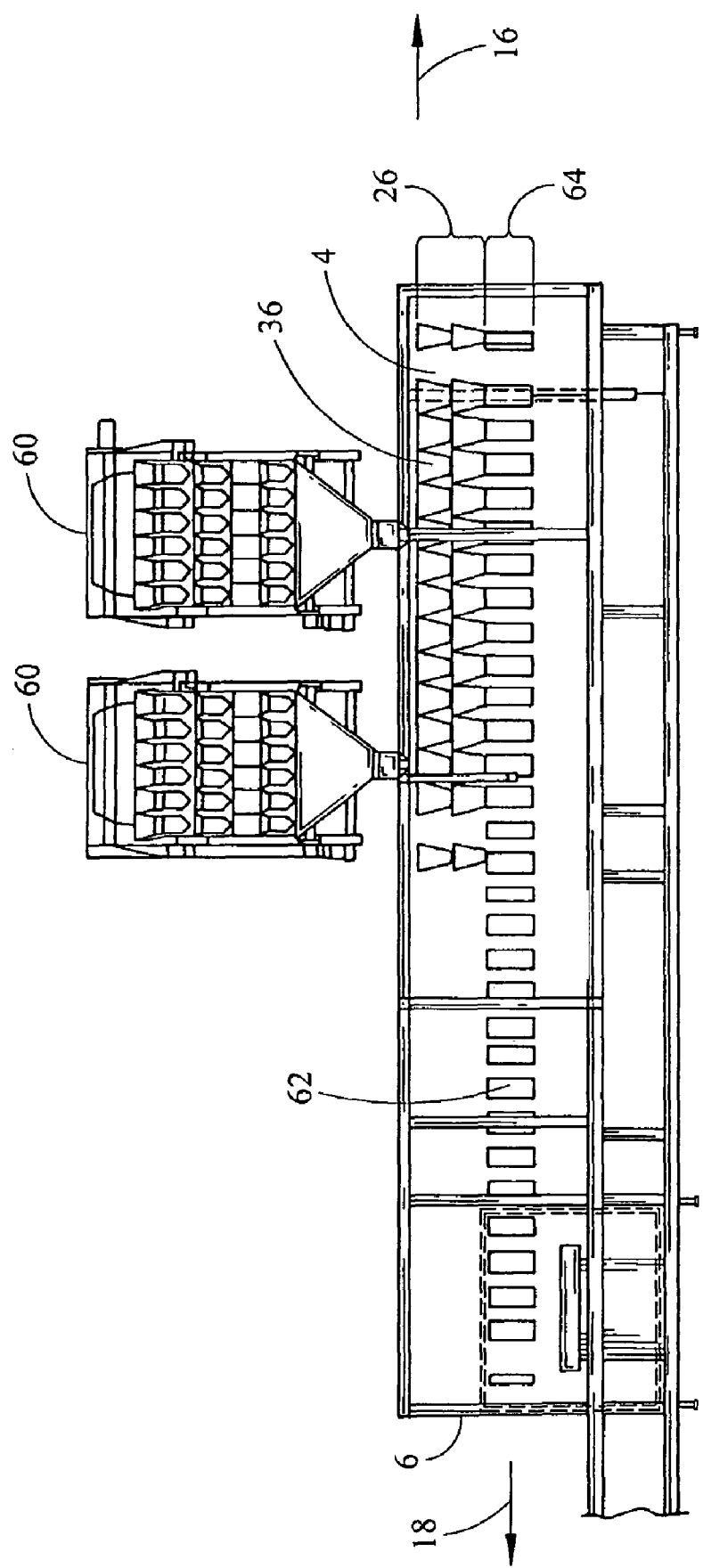
FIG. 3 is a side view of the loading assembly shown in FIG. 2.

Referring to FIGS. 1-3, a plurality of receptacles 34, 36 are coupled to the loop 26 at spaced apart locations therealong, with the distance between the centerline of adjacent receptacles defined as the "pitch" of the receptacles. In one embodiment, shown in FIG. 1, the receptacle 34 is configured as a pocket, which is shaped and adapted to receive a package, e.g. a carton or other packaging member. In other embodiments, shown for example in FIGS. 2 and 3, the receptacle 36 is configured to receive a substance or product from a scale positioned above the loop. In either embodiment, a servo drive 38 is coupled to the drive member 22 and is operable to rotate the drive member, and thereby move the continuous loop 26, at various speeds. The servo drives 14, 38 are programmed, or in a communication with a processor that actuates the servos, to synchronously move the carriage and loop as described below.

In operation, the servo drive 38 rotates the drive member 22 and moves the loop 26 along a continuous path 40 in counterclockwise direction when referring to FIGS. 1-3. At the same time, the servo drives 14 and electrical cylinder 12 reciprocally move or translate the carriage 4 relative to the support structure 6 along the longitudinal axis 20 in opposite first and second directions 16, 18. The electrical cylinder 12 moves the carriage at a predetermined velocity $V_c$ (or at a speed $S_c$) in the first and second directions 16, 18. At the same time, the drive member 22 moves the loop 26 relative to the carriage 4 at a speed $S_l$, with the first portion 28 of the loop 26 moving at a velocity $V_{l1}$, and the second portion 30 of the loop 26 moving at a velocity $V_{l2}$. The velocity and/or speed of the loop 26 relative to the support structure 6 (or ground) in either the first or second direction is the absolute velocity $V_a$, calculated as $V_a = V_c + V_l$. As is known in the art, velocity is a vector, having directional and magnitude (speed) components.

For example, and assuming that the carriage moves in the first direction 16 at a velocity $V_c = \frac{1}{2} V_a$, and the drive member 22 is rotating counterclockwise with the loop member moving at a speed $S_l = \frac{1}{2} V_a$, such that the velocity of the first portion $V_{l1} = \frac{1}{2} V_a$, the absolute velocity (and speed) $V_a$ of the first portion 28 of the loop relative to the support structure is $V_c + V_{l1} = \frac{1}{2} V_a + \frac{1}{2} V_a = V_a$.

At the same time, the velocity of the second portion of the loop $V_{l2} = -\frac{1}{2} V_a$. Accordingly, the absolute speed $V_a$ of the second portion is $V_c + V_{l2} = \frac{1}{2} V_a - \frac{1}{2} V_a = 0$, such that the second portion 30 is substantially stationary relative to the support structure 6 as the carriage moves in the first direction 16.

Conversely, when the carriage 4 moves in the second direction 18 at a velocity $V_c = -\frac{1}{2} V_a$, the drive member 22 is rotated such that the loop 26 moves at a speed $S_l$ of $1\frac{1}{2} V_a$. As such, the absolute velocity of the first portion 28 is again $V_{l1} + V_c = 1\frac{1}{2} V_a - \frac{1}{2} V_a = V_a$. At the same time, the absolute velocity of the second portion 30 is $V_{l2} + V_c = -1\frac{1}{2} V_a - \frac{1}{2} V_a = -2 V_a$, such that the speed of the second portion 30 of the loop 26 relative to the support structure 6 in the second direction 18 is $2 V_a$.

In this way, the first portion 28 of the loop has a continuous speed or velocity ($V_a$) relative to the support structure, or ground, regardless of whether the carriage is moving in the first or second directions 16, 18. At the same time, the second portion 30 of the loop is intermittently stopped ($V_a = 0$), i.e., maintained substantially stationary such that one or more of the receptacles 34, 36 can be loaded, and then moved in the second direction 18 at a speed of $2 V_a$. In essence, the first portion 28 moves with constant velocity (production speed) and the second portion 30 successively moves and stops. An example of this relative motion is provided below.

Example 1

A machine is configured to produce at least a 100 cartons per minute. The pitch (distance between the centerline of the receptacles 34, 36) of the loop 26 (configured as a chain assembly) is 7½ inches. Therefore, the production speed is 100×7½=750 inches per minute or 750:60=12.5 inches/sec. As such $V_a = 12.5$ inches/sec. The electrical cylinder moves the carriage in the first direction at a velocity $V_c = \frac{1}{2} V_a = (12.5$ inches/sec$)/2 = 6.25$ inches/sec. The first portion of the loop moves at a speed of $\frac{1}{2} V_a = 6.25$ inches/sec., such that the first portion 28 of the loop moves relative to the support structure 6 at a velocity of Vc+Vl1=6.25 inches/sec.+6.25 inches/sec=12.5 inches/sec. The second portion of the loop moves relative to the support structure at a velocity of Vc+Vl2=6.25 inches/sec.−6.25 inches/sec.=0. As such, the second portion 30 is stopped with receptacles 34, 36 positioned adjacent infeed devices 42 for loading a product or substance into the receptacle 34, 36 and in alignment with one or more infeed devices 42.

The loading can be accomplished by a plurality (one or more) of infeed devices 42 located adjacent the second portion 30. In particular, as shown in FIG. 1, the system incorporates two infeed devices 42. Depending on the number of infeed devices, the distance of travel of the carriage is varied, e.g. the distance is shorter for a lesser number of infeeds.

The system of FIG. 1 is a configured as a horizontal system with drive shafts 44 of the drive member 22 and idler member 24 oriented in a horizontal direction. As shown in FIGS. 2 and 3, the system is configured as a vertical packaging system, with the drive shafts 44 of the drive member 22 and idler member 24 oriented in a vertical direction.

In a preferred embodiment, the loading assembly is particularly well suited for a cartoning machine, as shown in FIG. 1, although it should be understood that it would work with other packaging systems. In particular, a rotary carton feeder 46 and 48 magazine loaded with folded, flat cartons 50 is positioned adjacent the first portion 28 of the loop above the loading assembly. Two infeed devices 42 are positioned adjacent the second portion 30 of the loop. Each infeed device is configured with an accelerator belt conveyor, as shown and described for example in U.S. Pat. No. 6,725,629, the entire disclosure of which is hereby incorporated herein by reference. The infeed device also includes an automatic respacing system 52, disclosed for example and without limitation in U.S. Pat. No. 6,648,125, the entire disclosure of which is hereby incorporated herein by reference.

In operation, the folded, flat cartons 50 are placed into the magazine 48. The rotary carton feeder 46 is activated to successively remove one flat carton 50 and erect or unfold the carton 50 as it is placed into one of the plurality of receptacles 34 coupled to the loop 26. The loop moves at a constant speed of Sl=½Va as explained above. The carriage moves from the home position (farthest right position) in the first direction at a velocity of Vl1=½Va, such that the carton and receptacle are moving at a velocity of Va along the first portion of the loop. A guide 54 helps to form and maintain the shape of the carton as it is moved by the loop 26. The carton feeder 46 successively inserts cartons 50 into each of the receptacles 34 as the loop 26 moves relative to the feeder 46 and support structure 6.

At the same time, the second portion 30 of the loop stops, as explained above, with a receptacle 34 aligned with each infeed device 42, such that the infeed devices 42 can insert a package or substance into the carton 50, which is open at the end facing the infeed device. As the carriage 4 reaches the "end" position (farthest left position), the cylinder 12 reverses the travel of the carriage, such that the loaded cartons carried by the second portion 30 are moved in the second direction 18. The second portion 30 carries the carton past a close and glue system, where the cartons are closed at the open end thereof with the flaps of the carton being automatically closed and glued. At the end of the second portion 30, the filled and sealed carton is pushed out of the receptacle 34 by a rail 56 and is discharged on to a discharge conveyor 58.

In the operation of the vertical cartoner, shown in FIGS. 2 and 3, the substance is loaded into the receptacle coupled to the loop 26 from a scale 60 positioned above the second portion 30 of the loading assembly. As the second portion is stopped, as explained above, the receptacles 36 are loaded. At the same time, the receptacles positioned in the first portion 28 of the loop, which are now full, are aligned with one or more receptacles 62 carried by a second continuous loop 64 traveling along a second continuous path 68, with at least a portion of the second path 68 aligned with at least a portion of the first path 40, and in particular along a first portion 28 of the first loop. The receptacles 62 are configured to receive a package or carton 50 from a carton feeder 46, which is supplied from carton magazine 48. As the first and second loops 26, 64 travel along a simultaneous path, the product from the first receptacle 36 is released into the receptacle 62, or container held thereby, on the second loop 64. The package is then closed and/or transferred to a discharge conveyor.

As disclosed herein, the same system can be incorporated into vertical and horizontal packaging systems. In this way, the need for additional and/or different equipment is eliminated, such that standardized equipment can be used for most applications.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A loading assembly for a packaging system comprising:
   a carriage coupled to a support structure and reciprocally moveable relative to said support structure along a longitudinal axis in a first direction and in a second direction opposite said first direction; and
   a continuous loop comprising a plurality of spaced apart receptacles, wherein said loop is moveably supported by said carriage, said loop moveable along a continuous path relative to said carriage between at least a first loop speed and a second loop speed, wherein said loop is moved relative to said carriage at said first loop speed when said carriage is moved in said first direction, and wherein said loop is moved relative to said carriage at said second loop speed when said carriage is moved in said second direction, wherein said second loop speed is greater than said first loop speed.

2. The loading assembly of claim 1 wherein said carriage is reciprocally moveable at a first carriage speed in said first direction and at a second carriage speed in said second direction, wherein said first and second carriage speeds are substantially the same.

3. The loading assembly of claim 1 wherein said continuous loop comprises first and second portions on opposite sides of said longitudinal axis, wherein said first portion moves relative to said carriage in said first direction and said second portion moves relative to said carriage in said second direction as said loop moves along said continuous path.

4. The loading assembly of claim 3 further comprising a carton feeder positioned adjacent said first portion of said loop, and an infeed device positioned adjacent said second portion of said loop.

5. The loading assembly of claim 4 comprising a plurality of said infeed devices positioned adjacent said second portion of said loop.

6. The loading assembly of claim 3 wherein said first and second portions are vertically spaced apart.

7. The loading assembly of claim 3 wherein said first and second portions are horizontally spaced apart.

8. The loading assembly of claim 3 further comprising a scale disposed adjacent said second portion of said loop.

9. The loading assembly of claim 1 further comprising a drive member coupled between said carriage and said loop.

10. The loading assembly of claim 9 wherein said drive member is rotatably mounted to said carriage adjacent a first end of said loop and further comprising an idler member spaced apart from said drive member and rotatably mounted to said carriage adjacent a second end of said loop.

11. The loading assembly of claim 1 wherein said carriage is moveable relative to said support structure at a first carriage speed in said first direction, wherein said first carriage speed is substantially equal to said first loop speed, and wherein said second portion of said loop is substantially stationary relative to support structure when said carriage is moved in said first direction at said first carriage speed.

12. A loading assembly for a packaging system comprising:
a carriage coupled to a support structure and reciprocally moveable relative to said support structure along a longitudinal axis in a first direction and in a second direction opposite said first direction;
a continuous loop comprising a plurality of spaced apart receptacles, wherein said loop is moveably supported by said carriage, said loop moveable along a continuous path relative to said carriage between at least a first loop speed and a second loop speed, wherein said loop is moved relative to said carriage at said first loop speed when said carriage is moved in said first direction, and wherein said loop is moved relative to said carriage at said second loop speed when said carriage is moved in said second direction, wherein said second loop speed is greater than said first loop speed, and wherein said continuous loop comprises first and second portions positioned on opposite sides of said longitudinal axis, wherein said first portion moves in said first direction and second portion moves in said second direction as said loop is moved along said continuous path relative to said carriage and wherein said first and second portions are vertically spaced apart;
a carton feed positioned adjacent said first portion of said loop; and
an infeed device positioned adjacent said second portion of said loop.

13. The loading assembly of claim 12 wherein said carriage is moveable at a first carriage speed in said first direction, wherein said first carriage speed is substantially equal to said first loop speed, and wherein said second portion of said loop is substantially stationary relative to said support structure when said carriage is moved in said first direction at said first carriage speed.

14. The loading assembly of claim 12 comprising a plurality of infeed devices positioned adjacent said second portion of said loop.

15. The loading assembly of claim 12 wherein said first and second portions are vertically spaced apart.

16. The loading assembly of claim 12 wherein said first and second portions are horizontally spaced apart.

17. The loading assembly of claim 12 further comprising a scale disposed adjacent said second portion of said loop.

18. The loading assembly of claim 12 further comprising a drive member coupled between said carriage and said loop.

19. The loading assembly of claim 18 wherein said drive member is rotatably mounted to said carriage adjacent a first end of said loop and further comprising an idler member spaced apart from said drive member and rotatably mounted to said carriage adjacent a second end of said loop.

20. A loading assembly for a packaging system comprising:
a carriage coupled to a support structure and reciprocally moveable relative to said support structure along a longitudinal axis in a first direction and in a second direction opposite said first direction;
a first continuous loop comprising a first plurality of spaced apart receptacles, wherein said first loop is moveably supported by said carriage, said first loop moveable along a first continuous path relative to said carriage between at least a first speed and a second speed, wherein said first loop is moved relative to said carriage at said first speed when said carriage is moved in said first direction, and wherein said first loop is moved relative to said carriage at said second speed when said carriage is moved in said second direction, wherein said second speed is greater than said first speed, and wherein said continuous loop comprises first and second portions positioned on opposite sides of said longitudinal axis, wherein said first portion moves in said first direction and second portion moves in said second direction as said first loop is moved along said continuous path relative to said carriage and wherein said first and second portions are horizontally spaced apart;
a scale positioned adjacent said second portion of said first loop; and
a second continuous loop comprising a second plurality of receptacles and moveable along a second continuous path, wherein at least a portion of said second path coincides with at least a portion of said first path, and wherein at least one of said second plurality of receptacles is disposed under at least one of said first plurality of receptacles when said portions of said first and second paths are coincident.

21. The loading assembly of claim 20 wherein said carriage is moveable at a first carriage speed in said first direction, wherein said first carriage speed is substantially equal to said first loop speed, and wherein said second portion of said loop is substantially stationary relative to said support structure when said carriage is moved in said first direction at said first carriage speed.

22. The loading assembly of claim 20 comprising an infeed device positioned adjacent said second portion of said first loop.

23. The loading assembly of claim 20 wherein said first and second portions are horizontally spaced apart.

24. The loading assembly of claim 20 further comprising a drive member coupled between said carriage and said first loop.

25. The loading assembly of claim 24 wherein said drive member is rotatably mounted to said carriage adjacent a first end of said first loop and further comprising an idler member spaced apart from said drive member and rotatably mounted to said carriage adjacent a second end of said first loop.

* * * * *